United States Patent [19]

Engström

[11] 4,173,609

[45] Nov. 6, 1979

[54] METHOD OF MANUFACTURING BUILDING ELEMENTS FROM SO-CALLED FOAMED CERAMICS

[75] Inventor: Carl B. A. Engström, Uttran, Sweden

[73] Assignee: Euroc Development AB, Malmo, Sweden

[21] Appl. No.: 805,484

[22] Filed: Jun. 10, 1977

[30] Foreign Application Priority Data

Jun. 10, 1976 [SE] Sweden .............................. 7606609

[51] Int. Cl.² ...................... C04B 21/02; C04B 33/34
[52] U.S. Cl. .................................. 264/43; 264/46.4; 264/60; 264/317; 264/DIG. 31; 264/DIG. 57; 264/DIG. 63
[58] Field of Search ........... 264/60, 43, 317, DIG. 31, 264/DIG. 57, DIG. 63, 46.4

[56] References Cited

U.S. PATENT DOCUMENTS

| 128,479 | 7/1872 | Fleischmann | 264/60 X |
|---|---|---|---|
| 264,505 | 9/1882 | Anderson | 264/60 |
| 608,756 | 8/1898 | Courtenay | 264/60 X |
| 838,496 | 12/1906 | Bigot | 264/60 |
| 880,753 | 3/1908 | Payne | 264/DIG. 57 |
| 1,185,555 | 5/1916 | Thomas | 264/60 |
| 1,245,285 | 11/1917 | Stegmayer | 264/60 |
| 1,330,249 | 2/1920 | Emley | 264/60 X |
| 1,614,926 | 1/1927 | Jeppson et al. | 264/60 |
| 1,941,403 | 12/1933 | Lansing et al. | 264/60 |
| 1,963,029 | 6/1934 | Powell | 264/60 X |
| 1,984,059 | 12/1934 | Dandini | 264/60 |
| 2,147,770 | 2/1939 | Ford | 264/60 |
| 2,310,432 | 2/1943 | Haux | 264/60 X |
| 2,357,399 | 9/1944 | Gregory | 264/60 X |
| 2,728,158 | 12/1955 | Bach | 264/60 |
| 2,825,420 | 3/1958 | Heine | 264/60 X |
| 2,902,739 | 9/1959 | Foster | 264/60 X |
| 3,007,222 | 11/1961 | Ragan | 264/60 X |
| 3,436,238 | 4/1969 | Criss | 264/43 X |
| 3,468,989 | 9/1969 | McMillan | 264/60 X |
| 3,619,240 | 11/1971 | Toussaint et al. | 264/60 X |
| 3,673,290 | 6/1972 | Brubaker et al. | 264/43 |
| 3,689,611 | 9/1972 | Hardy et al. | 264/43 |
| 3,745,201 | 7/1973 | Sundermann et al. | 264/43 |
| 3,762,935 | 10/1973 | Leach | 264/43 X |

FOREIGN PATENT DOCUMENTS

| 616280 | 3/1961 | Canada | 264/60 |
|---|---|---|---|
| 1151459 | 7/1963 | Fed. Rep. of Germany | 264/60 |
| 1283481 | 12/1961 | France | 264/60 |
| 39-2241 | 3/1964 | Japan | 264/60 |

*Primary Examiner*—Philip Anderson
*Attorney, Agent, or Firm*—Fred Philpitt

[57] ABSTRACT

The present invention involves a method of making foamed ceramic building elements by coating the bottom of a mould with a layer of uncolored glass material, applying a layer of colored glazing material over said layer of uncolored glass material and charging an expandable mass to the mould over said layer of glazing material.

7 Claims, 1 Drawing Figure

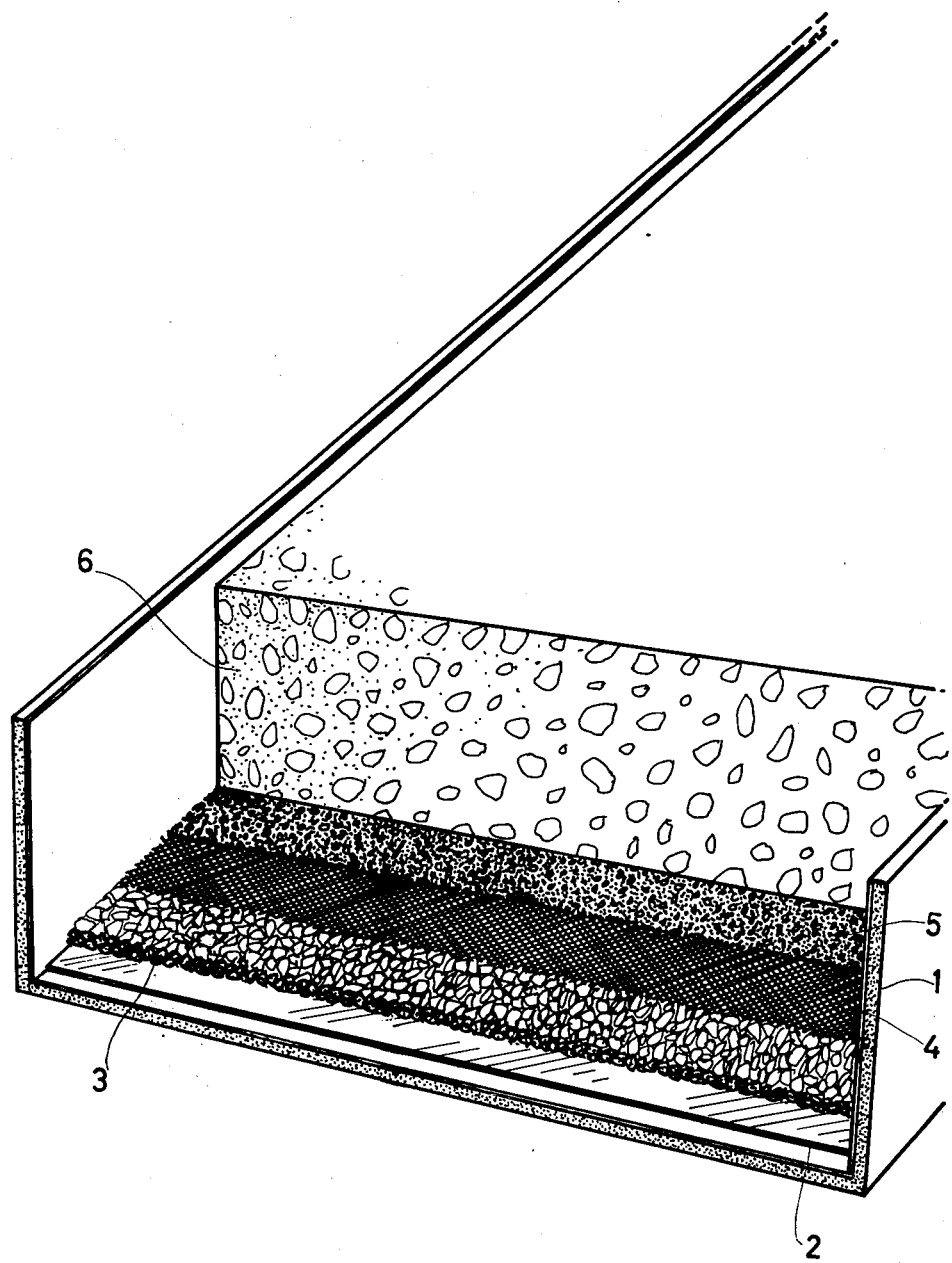

METHOD OF MANUFACTURING BUILDING ELEMENTS FROM SO-CALLED FOAMED CERAMICS

The present invention relates to a method of manufacturing plate-like or brick-like foamed-ceramic building elements from an expandable mass which, when heated to temperatures between 800°-1100° C., is able to form foamed ceramics, the expandable mass being charged to a mould made of a refractory material, on at least the bottom surface of which mould there is arranged a layer of a glass material or of a glass-forming composition that will not expand when heated and that has a melting point of 800°-1200° C., whereafter the mould, together with the contents thereof, is heated to a temperature between 800° and 1000° C. for a period of time such that the plate-like foamed-ceramic element, formed subsequent to said expansion process, and said glass material have fused together.

This method forms part of the art. In accordance with one embodiment the glass material may comprise a crushed glass that, when heated, sinters together layerwise with the layer of foamed ceramic thereabove. With regard to the known method, it is a desire to produce a sintered layer having an appropriate or conforming colour tone. This desideratum has been satisfied either by using a glass material having the desired colour or by adding to the glass-forming composition a substance which imparts the desired colour to the glass. The known method is encumbered with a number of disadvantages, the main disadvantage being that access must be had to a large number of different sorts of glass material exhibiting different colour tones, wherewith manufacture based on the known method is encumbered with the costs involved in storing such a large number of glass types.

It has now been found that this disadvantage can be overcome, or substantially overcome by introducing certain complementary measures into the known method described in the introduction. The method according to the invention is characterised in that the glass material or glass-forming composition used in a plain glass, i.e. an uncoloured glass, or a glass which does not contain substances that when the glass-forming composition is melted cause the glass to be coloured, and by applying to the layer of glass material or glass-forming composition a carrier sheet or meltable or destructable uncoloured material prior to charging the expandable mass, used to form the foamed ceramic, into the mould of refractory material, on which sheet there is applied, or preferably previously applied, a pigmented glazing composition, so that subsequent to the expansion of the expandable mass and subsequent to the conversion of the glass material or the glass-forming composition to a sintered layer fused to the foam ceramic and the melting or destruction of said carrier sheet the layer of glazing composition appears as a coloured background to the sintered layer.

According to the invention the glazing mass suitably contains a dye-frit, i.e. a glass or an amorphous material containing a colouring substance in solution. The colouring substance may be a metal oxide. A colour or dye frit may contain varying quantities of flux, such as borax, to vary the melting point. Conveniently, the glaze also contains a finely -divided glass so as to extend the mass with respect to the colouring substance. The glazing composition may also be one containing, for example, salts of colour-producing oxides, these latter being formed when heating the refractory mould with its contents and giving rise to the desired colour tone of the intermediate layer.

According to the invention the carrier layer normally comprises a sheet of glass fibre which may be in a felt or woven form. When heated to form a foam ceramic, the glass-fibre sheet will melt and the major parts of the molten material, which is uncoloured, will fuse with the sintered layer in the bottom of the mould.

In accordance with the invention one suitable process comprises spraying the glazing mass in suspension on a sheet comprising glass fibres, the sprayed layer being dried prior to introducing the sheet into the refractory mould. According to an alternative embodiment, a layer of glazing compound can be placed on a sheet of foil or the like and the layer permitted to dry or solidify, whereafter the foil sheet is removed from the rigid sheet of glazing compound. This rigid sheet is then placed in the refractory mould in accordance with the above.

The method according to the invention affords the possibilities of promoting all the possible shades (nyances) of the colour-producing layer with a background effect in relation to the sintered glass layer.

The method will now be described in more detail with reference to the accompanying drawing, which is a perspective view of a refractory mould with one end wall of the mould removed to show the different layers produced by the method of the invention.

In the drawing, the mould is referenced 1. On the bottom of the mould there is placed a sheet or foil 2 of a plastics material with a layer 3 of crushed, plain glass arranged thereon. The particles of glass are bound together by means of an adhesive and the glass is washed very thoroughly prior to being placed on the sheet 2. On top of the crushed-glass layer 3 there is placed a glass-fibre cloth 4 and on top of the cloth 4 there is a layer 5 of a pigmented glazing compound containing finely crushed glass. The sheet 4 with the layer 5 is preferably prepared externally of the refractory mould. Placed on top of the layer 5 is a layer 6 of an expandable compound capable of forming a foamed ceramic when the mould is heated to approximately 850° C. When heated, the glass fibre cloth 4 will melt together with the crushed glass layer 3, the two sintering together to form a transparent layer. The layer 5 of glazing compound forms a coloured layer which, subsequent to removing the finished element from the mould, is visible as a background through a sintered colourless glass layer.

EXAMPLE

A finely ground glass of window-pane quality and a glass frit containing cobalt oxide as a pigment were admixed with an aqueous solution of acrylate resin and ethylhydroxeyethyl cellulose. The quantity of glass frit added was 0.5% calculated on the glass of window pane quality. A glass fibre cloth was then sprayed with the suspension and dried.

A layer of crushed glass and washed window glass having a particle size of between 1 and 5 mm was then placed in a refractory mould, the inner surface of which was coated with a layer of dry Kaolin as a parting agent.

The fibre cloth prepared in accordance with the above with an adhesive bound glass powder containing a colourant was placed on the layer of crushed glass in the refractory mould, whereafter an expandable compound capable of forming a foam ceramic was heated to temperatures between 700° and 1100° C. was placed on the powdered glass.

The mould and its contents was then charged to a furnace and heated in an oxidizing atmosphere to foam the expandable mass.

The foamed ceramic element subsequent to cooling had a cobalt-blue surface which gave the appearance that the colour penetrated the surface of the element to a reasonable depth.

What I claim is:

1. In the method of manufacturing a block-like foamed ceramic building element in a mould of refractory material which comprises:
   (a) coating at least the bottom surface of the mould with a layer of a glass material or a glass-forming composition having a melting point of 800°–1000° C. and being non-expandable when heated,
   (b) charging an expandable ceramic composition into the mould, said expandable ceramic composition being capable of forming a foamed ceramic when heated to a temperature between 800° and 1100° C.,
   (c) heating the mould and its contents to temperatures between 800° and 1000° C. for a period of time sufficient for the foamed ceramic and the glass to fuse together at their interface,
the improvement which comprises
   (1) said glass material or glass-forming composition being uncolored and free from substances which will cause coloring when the glass material or glass-forming composition is melted, said glass material or glass-forming composition being in the form of crushed particles, and
   (2) prior to charging the expandable mass to the mould placing on the layer of glass material or glass forming compositions a carrier sheet, said carrier sheet
      being composed of meltable or destructible material,
      carrying a layer of pigmented color glazing material,
   (3) said heating of the mould being carried out under oxidizing conditions to foam the ceramic and to fuse together the glass,
whereby, after the expandable mass has expanded and the glass material or the glass-forming composition has been sintered and said carrier sheet has been melted or destroyed, the pigmented glaze layer appears as a colored background through the uncolored sintered glass layer.

2. A method according to claim 1 wherein the glazing material comprises a mixture containing a dye frit.

3. A method according to claim 2 wherein said mixture also contains finely-divided glass.

4. A method according to claim 1 wherein said carrier sheet comprises a sheet of glass fibers.

5. A method according to claim 4 wherein said glazing material is sprayed onto the carrier sheet in suspension with water, and wherein the sprayed layer is dried prior to introducing the carrier sheet into the refractory mould.

6. A method according to claim 1 wherein said glazing material is applied to a sheet of plastics foil, whereafter the sheet is dried and the solidified layer charged to the refractory mould.

7. A method according to claim 6 wherein the sheet of foil is separated from the solidified layer of glazing material prior to charging said layer to the mould.

* * * * *